United States Patent
Bongrand et al.

(10) Patent No.: US 6,293,295 B1
(45) Date of Patent: Sep. 25, 2001

(54) SAFETY DEVICE FOR A HOT WATER FAUCET FOR SANITARY USE AND FAUCET, PARTICULARLY THERMOSTAT, EQUIPPED WITH SAID SAFETY ELEMENT

(75) Inventors: Laurent Bongrand, Verneuil S/Igneraie; Christian Bommelaer, Friaucourt, both of (FR)

(73) Assignee: Watts Eurotherm, S.A., Fressenneville (FR)

( * ) Notice: Subject to any disclaimer, the term of this patent is extended or adjusted under 35 U.S.C. 154(b) by 0 days.

(21) Appl. No.: 09/505,060

(22) Filed: Feb. 16, 2000

(30) Foreign Application Priority Data

Feb. 16, 1999 (FR) .................................. 99 02038

(51) Int. Cl.[7] .................................. F16K 17/14
(52) U.S. Cl. .............................. 137/74; 137/75
(58) Field of Search ......................... 137/74, 75

(56) References Cited

U.S. PATENT DOCUMENTS

| | | | |
|---|---|---|---|
| 973,260 | * 10/1910 | Creighton | 137/75 |
| 1,892,674 | * 1/1933 | Loverin | 137/75 |
| 1,960,272 | 5/1934 | Lovekin . | |
| 2,012,873 | * 8/1935 | Gillen | 137/75 |
| 2,301,014 | * 11/1942 | Burlin | 137/75 |
| 2,637,333 | * 5/1953 | Houston | 137/75 |
| 3,730,205 | 5/1973 | Guimbelot . | |

OTHER PUBLICATIONS

Braukmann Armaturent, Claims 1,2; Fig. 1 (Federal Republic of Germany) DE 69 21 553 U, 1999.

Lazlo; p. 2, Line 54; Figs. 1–3 (Federal Republic of Germany) De 673 810 C, 1999.

* cited by examiner

*Primary Examiner*—A. Michael Chambers
(74) *Attorney, Agent, or Firm*—William L. Feeney; Miles & Stockbridge

(57) ABSTRACT

The invention relates to a safety device for a sanitary hot water faucet characterized in that it comprises:

Figure 1:
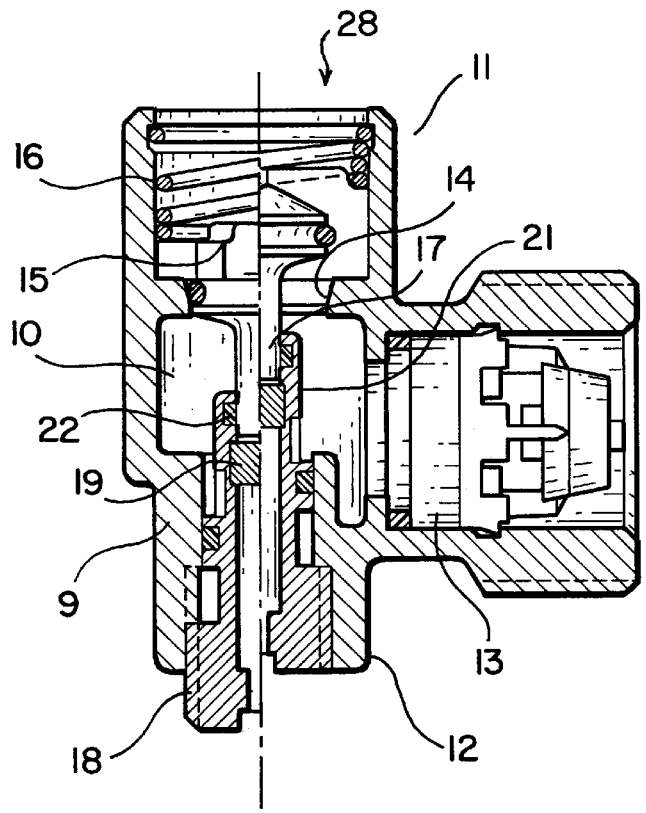

- a receptacle (10) passing all the way through a casing having a T shape,
- a seat (14) of a valve (15), delimited in the bore near its upstream end, installed in the receptacle from the upstream end:

- a valve (15) with an elastic element (16) that stresses it toward its so-called closed position and
- a so-called control rod (17) of the valve, locally comprising a fusible material (19) which, when it is subjected to a temperature higher than a predetermined temperature, melts so that the length of the control rod is reduced, thus causing the closing of the valve.

7 Claims, 2 Drawing Sheets

SAFETY DEVICE FOR A HOT WATER FAUCET FOR SANITARY USE AND FAUCET, PARTICULARLY THERMOSTAT, EQUIPPED WITH SAID SAFETY ELEMENT

The invention relates to a safety device for a hot water faucet for sanitary use, such as a thermostatic faucet.

It also relates to the faucet, particularly thermostatic, equipped with said safety device.

Conventionally, a so-called thermostatic faucet comprises:

- a body that locally delimits a so-called mixing chamber fed at least indirectly by a cold water inlet pipe, and at least indirectly by a hot water inlet pipe,
- an outlet for mixed water having a predetermined temperature,
- a device for adjusting the flows of cold water and hot water to obtain a so-called outgoing water at the appropriate temperature, which device comprises an element that, being sensitive to the temperature of the water in the mixing chamber, controls the movement of a slide valve that adjusts the cross sections of the passages of the hot water and cold water inlets as a function of a set-point value.

Thus, when the water in the mixing chamber exceeds the set-point temperature, the sensitive element reduces the cross section of the passage of the hot water inlet, and at the same time increases the cross section of the passage of the cold water inlet, and vice versa if the temperature is lower than the set-point temperature.

The sensitive element necessarily has an inertia in order to prevent the system from being constantly unstable.

This inertia is clearly understood to be harmful in the event of an abrupt cutoff of the cold water, since there is an immediate increase in the temperature of the water, which can reach temperatures that are dangerous if the water comes in contact with the skin.

The objective of current developments is to improve these sensitive elements, specifically in order to obtain a faster response, but the results have not yet achieved the intended aim.

There are known fusible lead elements (DE-6.921.553) associated with a valve, but they do not solve the problem of the sensitivity in thermostatic faucets in which the temperature is much lower.

One of the objects of the invention is to notably improve the safety of hot water faucets for sanitary use, such as thermostatic faucets.

To this end, the subject of the invention is a safety device for such a faucet, characterized in that the device comprises:

- a casing that delimits a receptacle running all the way through said casing, with one of the two ends of said receptacle, called the upstream end, which at least indirectly has means for hydraulically connecting to the outlet of a hot water faucet, and upstream from the other end, an evacuation conduit that opens out of the casing and hydraulically connects to a point intermediate to the two ends of the receptacle, giving the casing a T-shape,
- a seat of a valve, delimited in the bore near its upstream end, and installed in the receptacle, beginning at the upstream end:
- a valve with an elastic element that stresses it toward its so-called closed position by applying it to the seat, and
- a so called control rod of the valve, connected to a control device capable of pushing said valve toward the so-called open position, counteracting the action of the aforementioned elastic element, between the valve and the control device, this control rod locally comprising a fusible material 19 which, when it is subjected to a temperature higher than a predetermined temperature, melts so that the length of the control rod is reduced, thus causing the closure of the valve.

Figure 3:
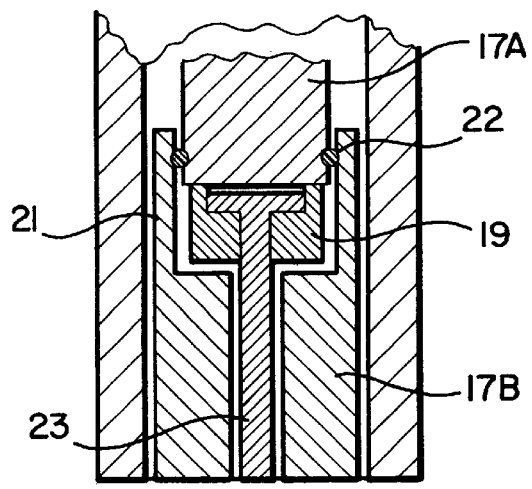
Figure 2:
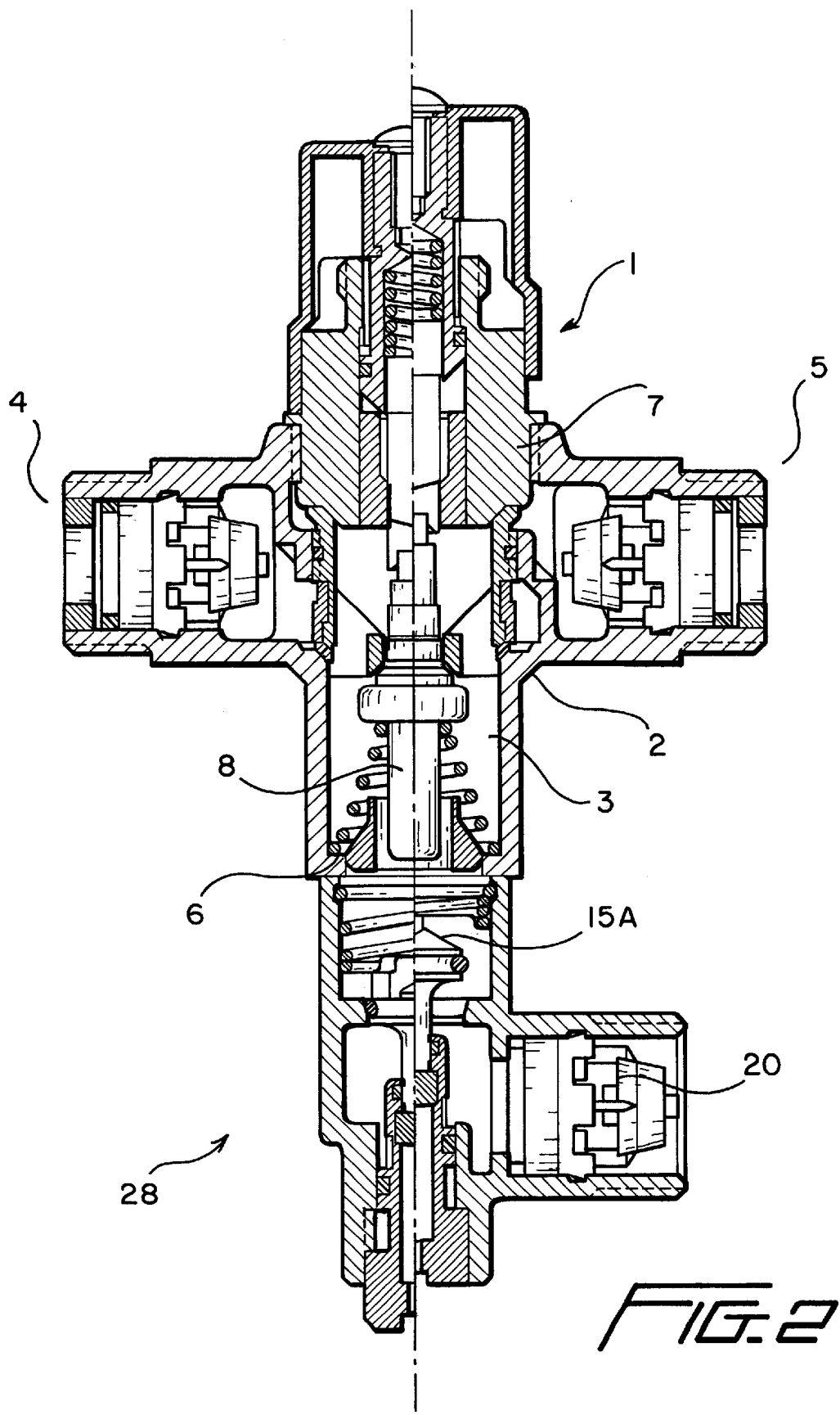

The invention will be clearly understood with the aid of the following description given as a non-limiting example, in reference to the attached drawing, which schematically represents:

FIG. 1: axial section of a safety device,
FIG. 2 axial section of a safety device installed on a thermostatic faucet,
FIG. 3: a detail of embodiment.

Referring to the drawing, we see a hot water faucet 1 for sanitary use, such as a thermostatic faucet.

A thermostatic faucet 1 of this type comprises:
- a body 2 that locally delimits a so-called mixing chamber 3 fed at least indirectly by a cold water inlet pipe 4 and at least indirectly by a hot water inlet pipe 5,
- an outlet 6 for mixed water having a predetermined temperature and
- a device 7 for adjusting the flows of cold water and hot water to obtain a so-called outgoing water at the appropriate temperature, which device comprises an element 8 that, being sensitive to the temperature of the water in the mixing chamber, controls the movement of a slide valve that adjusts the cross sections of the passages of the hot water and cold water inlets as a function of a set-point value.

Thus, when the water in the mixing chamber exceeds the set-point temperature, the sensitive element reduces the cross section of the passage of the hot water inlet, and at the same time increases the cross section of the passage of the cold water inlet, and vice versa if the temperature is lower than the set-point temperature.

The sensitive element necessarily has an inertia in order to prevent the system from being constantly unstable.

To prevent this inertia from having harmful consequences, according to one characteristic, the faucet is equipped, downstream from the hot water outlet 6, with a safety device 28 that closes the outlet in response to an excessive temperature.

According to one characteristic of the invention, the security device 28 comprises:

- a casing 9 that delimits a receptacle 10 running all the way through said casing, with one 11 of the two ends 11, 12 of said receptacle, called the upstream end 11, which at least indirectly has means for hydraulically connecting to the outlet of a hot water faucet, and upstream from the other end 12, an evacuation conduit 13 that opens out of the casing and hydraulically connects to a point intermediate to the two ends of the receptacle, giving the casing a T-shape,
- a seat 14 of a valve 15, delimited in the bore near its upstream end, and installed in the receptacle, beginning at the upstream end:
- a valve 15 with an elastic element 16 that stresses it toward its so-called closed position by applying it to the seat 14, and
- a so called control rod 17 of the valve, connected to a control device 18 capable of pushing said valve toward the so-called open position, counteracting the action of the aforementioned elastic element, between the valve and the control device, this control rod locally comprising a fusible material 19 which, when it is subjected to a temperature higher than a predetermined temperature, melts so that the length of the control rod is reduced, thus causing the closure of the valve.

Advantageously, the evacuation conduit houses a nonreturn valve 20.

Preferably, the control rod 17 of the valve is in two pieces 17A, 17B:

one of the pieces 17A is integral with the valve and forms a valve stem that extends along the longitudinal axis of the bore, and the other piece 17B comes to rest against the free end of the stem indirectly through the fusible material 19.

Preferably, this fusible material 19 is housed in a sheath 21 that insulates the fusible material from fleeting temperature variations.

This sheath also makes it possible to physically insulate the fusible material from the water, and when the fusible material melts, to prevent it from mixing with the water. This is important because the current fusible materials are toxic.

The stem of the valve is partially inserted into this sheath.

An O-ring 22 disposed at the inlet of the sheath 21 completes the insulation of the fusible material from the water.

This thermal insulation thus creates a slight delay effect, avoiding the transitory phenomena that are allowable by law because, given the very short duration allowed, these temperature spikes are not dangerous.

In fact, if the water only exceeds the required temperature for a brief moment, the excessive temperature will be diverted, after a brief passage, into the downstream conduit.

The utilization of a fusible material requires it to be replaced whenever it is activated.

This calls on the user to ask what caused the incident and hence to make sure that the rest of the installation is operating normally.

The replacement of the fuse can be done without shutting off the water that feeds the hot water faucet since the valve is in the closed position.

A device of this type also makes it possible to easily check the efficiency of the nonreturn valve placed downstream or of the valve, i.e., its impermeability.

The removal of the fusible part makes it possible to check the impermeability by opening the chamber containing the fuse part to the atmosphere.

Preferably, an indicator 23 that indicates the melting of the fuse is provided.

For example, the fuse surrounds the end of a pin.

When the fuse melts, the pin retracts, moved in this direction by the rod 17A of the valve 15, and protrudes to the outside.

The safety setting is therefore visible.

The device for controlling the valve comprises means for cooperating, for example, with the receptacle so as to allow the controlled movement of the valve.

The rod of the control device is threaded and the bore is threaded so that they cooperate.

Gaskets are of course provided.

A safety system of this type can be added to already existing thermostatic faucets to bring them into conformity with new regulations.

It will be noted that the head of the valve 15 is directed toward the flow and the stem of the valve is placed downstream so as to improve the reaction speed of the valve in the event of overheating.

This also increases its precision.

In essence, it is the entire surface 15A of the valve that receives the flow of water.

What is claimed is:

1. Safety device for a hot water faucet for sanitary use, characterized in that it comprises:

a casing (9) that delimits a receptacle (10) running all the way through said casing, with one (11) of the two ends (11, 12) of said receptacle, called the upstream end (11), which at least indirectly has means for hydraulically connecting to the outlet of a hot water faucet, and upstream from the other end (12), a so-called evacuation conduit (13) that opens out of the casing and hydraulically connects to a point intermediate to the two ends of the receptacle, giving the casing a T-shape, a seat (14) of a valve (15) delimited in the bore near its upstream end, and installed in the receptacle, beginning at the upstream end:

a valve (15) with an elastic element (16) that stresses it toward its so-called closed position by applying it to the seat (14), and a so-called control rod (17) of the valve, connected to a control device (18) capable of pushing said valve toward the so-called open position, counteracting the action of the aforementioned elastic element, between the valve and the control device, this control rod locally comprising a fusible material (19) subject to the effect of the water temperature which, when it is subjected to a temperature higher than a predetermined temperature, melts so that the length of the control rod is reduced, thus causing the closing of the valve.

2. Safety device according to claim 1, characterized in that the control rod (17) of the valve is in two pieces (17A, 17B):

one of the pieces (17A) is integral with the valve and forms a valve stem that extends along the longitudinal axis of the bore, and the other piece (17B) comes to rest against the free end of the stem indirectly through the fusible material (19).

3. Safety device according to claim 1 (or 2), characterized in that the fusible material (19) is housed in a sheath (21) that insulates the fusible material from fleeting temperature variations.

4. Safety device according to claim 3, characterized in that:

the stem of the valve is partially inserted into this sheath and an O-ring (22) disposed at the inlet of the sheath (21) completes the insulation of the fusible material from the water.

5. Safety device according to claim 1, characterized in that the evacuation conduit houses a nonreturn valve (20).

6. Safety device according to claim 1, characterized in that it comprises an indicator (23) that indicates the melting of the fuse.

7. A thermostatic Faucet including a safety device according to claim 1 any of claims 1.

* * * * *

UNITED STATES PATENT AND TRADEMARK OFFICE
CERTIFICATE OF CORRECTION

PATENT NO. : 6,293,295 B1  
DATED : September 25, 2001  
INVENTOR(S) : Bongrand et al.

It is certified that error appears in the above-identified patent and that said Letters Patent is hereby corrected as shown below:

<u>Column 4, claim 7,</u>  
Line 61, "claim 1", delete "any of claims 1";

Signed and Sealed this

Ninth Day of April, 2002

Attest:

JAMES E. ROGAN  
*Director of the United States Patent and Trademark Office*

*Attesting Officer*